March 28, 1933.   S. M. ANDERSON   1,902,818
AIR CONDITIONING CONTROL
Filed Sept. 10, 1930   3 Sheets-Sheet 3
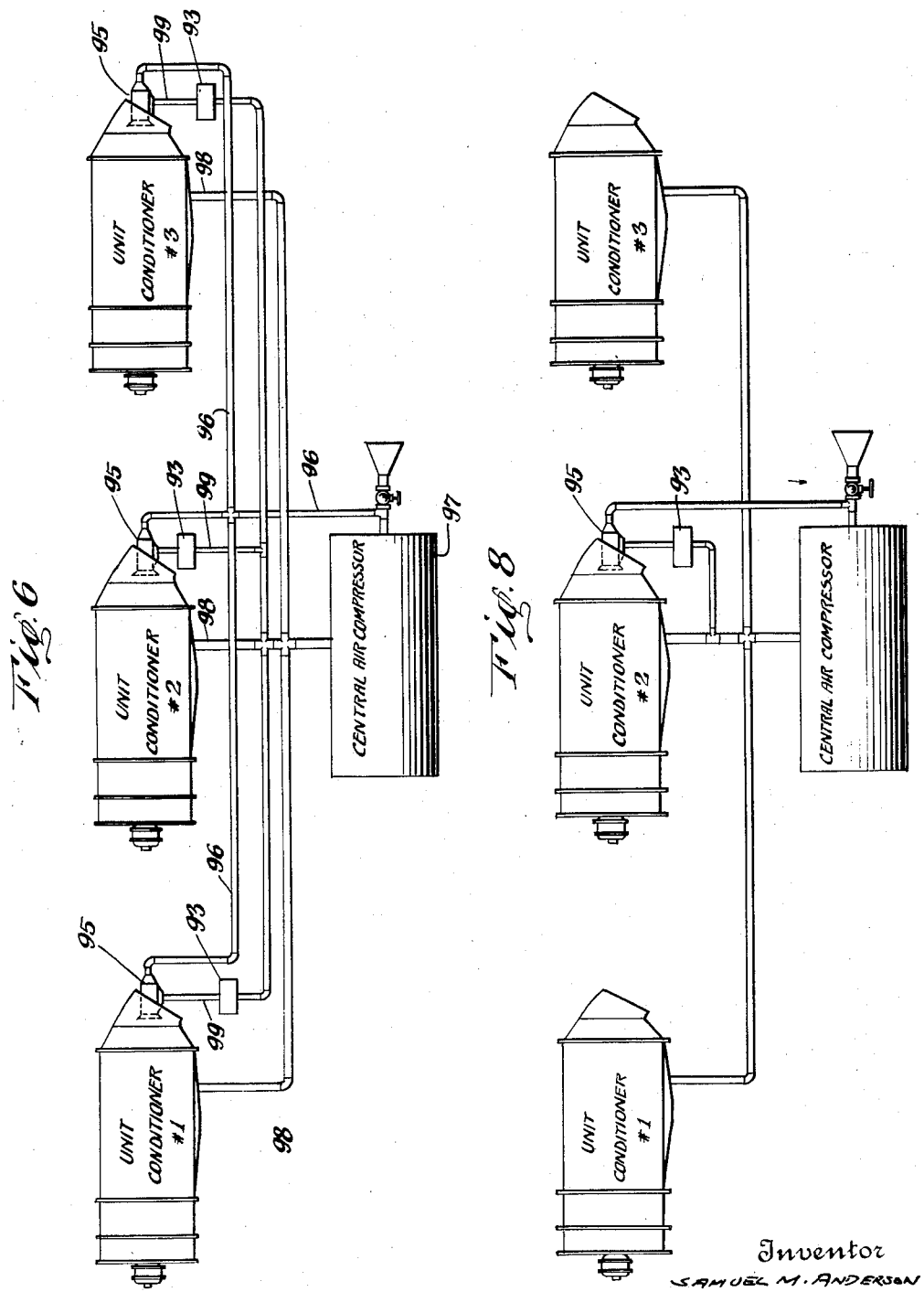
Inventor
SAMUEL M. ANDERSON
By his Attorney Patented Mar. 28, 1933

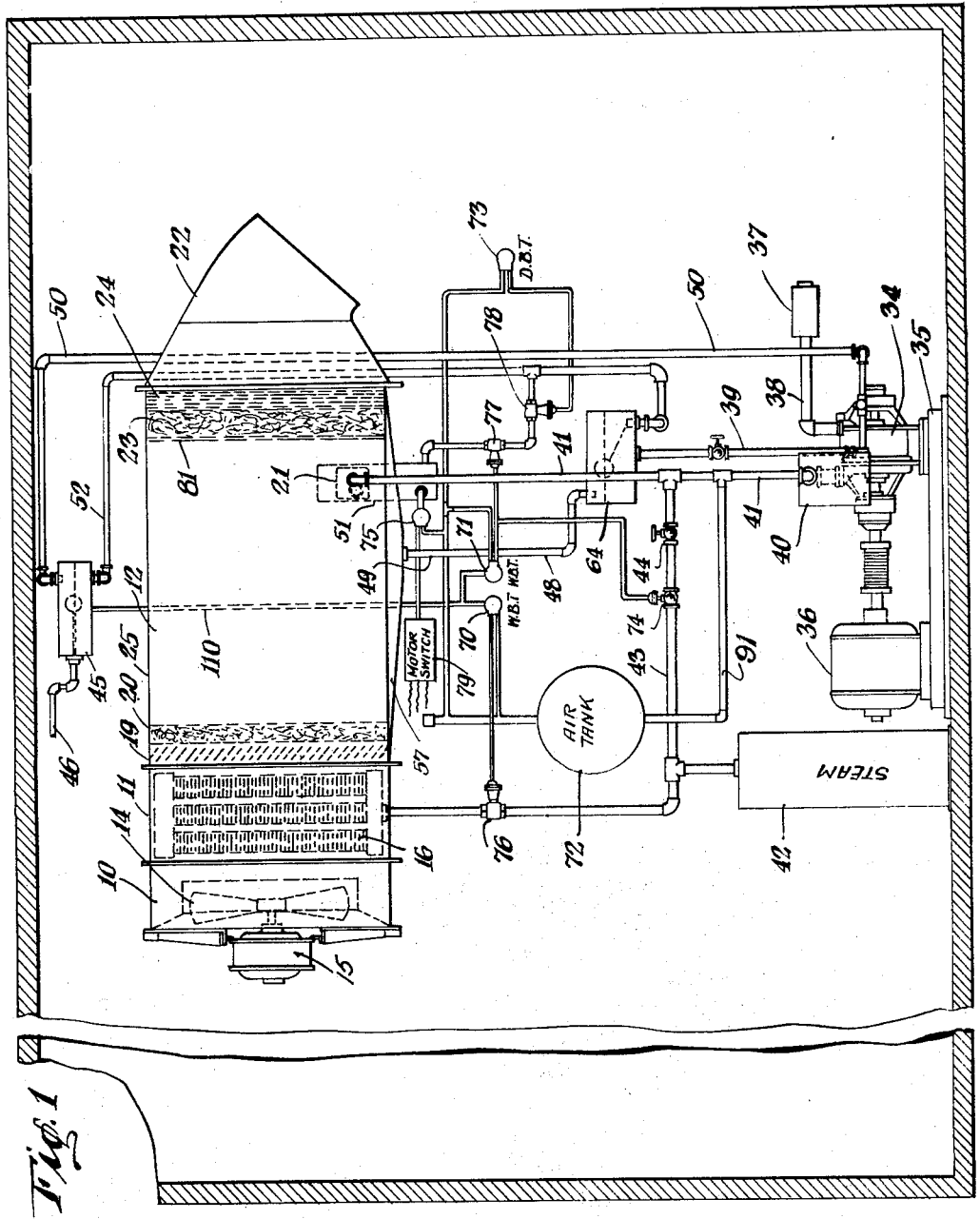

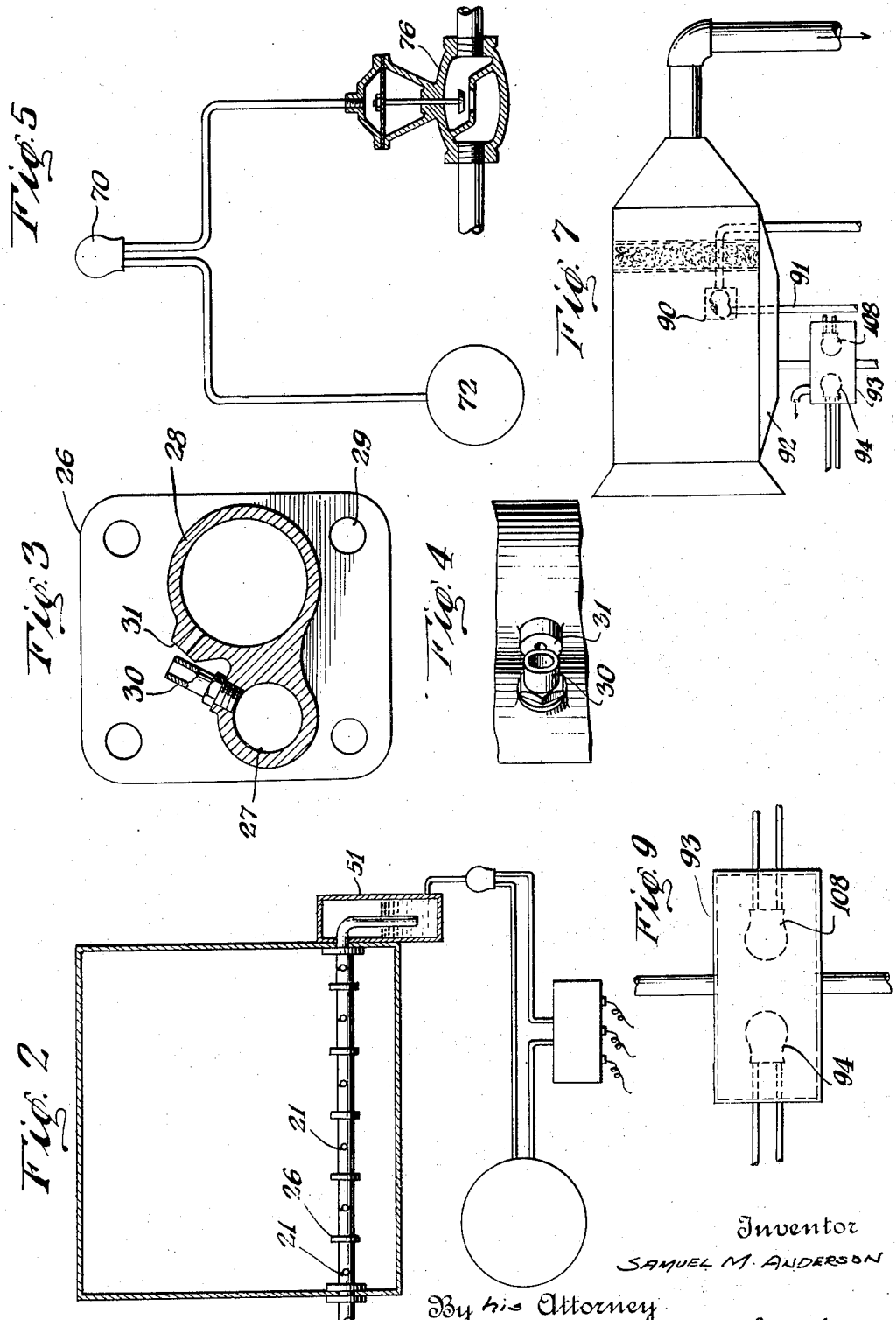

1,902,818

UNITED STATES PATENT OFFICE

SAMUEL M. ANDERSON, OF SHARON, MASSACHUSETTS, ASSIGNOR TO B. F. STURTEVANT COMPANY, OF BOSTON, MASSACHUSETTS, A COMPANY

AIR CONDITIONING CONTROL

Application filed September 10, 1930. Serial No. 481,012.

This invention relates to air conditioning systems and relates more particularly to automatic controls for such systems.

An object of the invention is to automatically control the relative humidity of the air leaving an air conditioning system.

Another object of the invention is to automatically control the dry bulb temperature of the air leaving an air conditioning system.

Another object of the invention is to automatically control the wet bulb temperature of the air leaving an air conditioning system.

A further object of the invention is to hold the temperatures and relative humidity of the air leaving an air conditioning system at a predetermined level by automatic controls regardless of the temperature and humidity changes of the air entering the system.

Other objects of the invention will be brought out in the following description of the apparatus comprising the invention and its operation.

It is now well known that the amount of moisture in the air breathed is an important factor in comfort conditions and that in winter living conditions in heated buildings are greatly improved when the air within the buildings contains a substantial amount of moisture or water vapor. When air is heated in the absence of free water, as is customary when hot air furnaces or steam radiators are used for heating, it becomes drier, although the actual amount of water vapor present remains the same. In other words, the absolute humidity is the same, but the relative humidity has been lowered. Relative humidity is the ratio of the weight of water vapor in a given space as compared to the weight which the same space is capable of containing when fully saturated at the same temperature. Dry heated air is injurious to the nose, throat, and lungs when constantly breathed and is at times responsible for sore throats and ordinary colds. In order that healthful conditions may be restored, it is necessary to add moisture to heated air. Sufficient moisture should be added to the air in public buildings to maintain a relative humidity from 35 to 50%. The humidity to be recommended in good practice is 50% with a room temperature of 72 degrees F.

Humidity also plays a prominent part in many manufacturing processes. The amount of moisture required varies widely according to the nature of the process, some processes requiring high and others low relative humidities. In textile mills the necessity for humidifying and cooling the air has long been known. Today the field of application of humidity control apparatus includes such industries as candy, paper, tobacco, rubber goods, bakeries, and others. The advantages obtained through humidity control are many. The time of manufacture may be reduced, the quality increased, less breakage or waste occurs. In fact, in all cases continuous production may proceed under conditions that are most favorable, regardless of outdoor weather.

Comfort conditions for human beings and proper air conditions for manufacturing processes are expressed both in terms of relative humidity and temperature. For example, as has been before stated, a desirable indoor condition is to have a relative humidity of 50% and a room temperature of 72 degrees F. Relative humidity in turn depends upon both the factors of temperature and moisture content, and a clear conception of the relation between temperature and moisture content is essential to an appreciation of air condition. Relative humidity of air is determined by a comparison of the wet and dry bulb temperatures of the air. The dry bulb temperature of the air may be taken with the ordinary common thermometer since the dry bulb temperature is a measure of the degree of heat of the air. There is a second temperature of the air which measures its degree of moistness just as the dry bulb temperature measures its degree of heat. This second temperature is called the wet bulb temperature and is the temperature of evaporation, that is, the temperature at which the air would become saturated if moisture were added to it without the addition or subtraction of heat. The wet bulb temperature in conjunction with the dry bulb temperature is an exact measure of the humidity of the air and it is also an exact measure of the heat content of the air.

According to one feature of the present invention, a thermostat responsive to the wet bulb temperature of the air leaving an air conditioning system or within an enclosure controls the temperature of the air entering the system.

According to another feature of the invention a thermostat responsive to the dry bulb temperature of the air, within an enclosure the air of which is to be conditioned, controls the amount of moisture added to the air passing through the air conditioning system and so controls the relative humidity of the air leaving the system.

According to another feature of the invention a series of air conditioning units are automatically controlled from a single unit.

The invention will now be described with reference to the drawings of which:

Fig. 1 is a schematic side view partly in section of one embodiment of an air conditioning unit with automatic controls according to this invention;

Fig. 2 is an end view in section of the spray chamber of the air conditioning unit of Fig. 1;

Fig. 3 is a sectional view of the atomizer nozzle used in the spray chamber shown by Figs. 1 and 2;

Fig. 4 is a top view of the spray nozzle of Fig. 3;

Fig. 5 is a view showing the operation of a valve by a thermostat of Fig. 1;

Fig. 6 is a schematic view showing several unit air conditioners with unit samplers for determining the wet bulb temperature of the air passing therethrough;

Fig. 7 is a side view partially in section of one of the air samplers of Fig. 6;

Fig. 8 is a schematic view of a series of unit air conditioners with one air sampler controlling the operation of all of the units;

Fig. 9 is an enlarged view of the water reservoirs 93 of Figs. 6 and 8, and

Fig. 10 is an enlarged view of the thermostat 70 of Fig. 1 and shows the moistened wick applied to the thermostat element.

Reference is now made to Fig. 1 which shows a complete air conditioning unit according to this invention. The ventilating unit 10 contains the fan 14, driven by the electric motor 15. Attached to the ventilating unit 10 is the heater unit 11 which contains the steam heating coils 16. The air conditioning chamber unit 12 is attached at one side to the heater unit 11 and has mounted therein at this side the separator baffle plates 19 against which is placed the filter 20. This filter preferably contains galvanized metal wool which forms a large number of small interstices to permit the air to flow into the air conditioning chamber without excessive resistance but which serves effectively to catch any entrained water particles. Contained also within the conditioning chamber unit 12 is the atomizer nozzle 21 the details of which are shown more clearly by Figs. 3 and 4. The atomizer nozzle 21 serves, as will be explained in more detail later, to atomize conditioning water so that it may be vaporized by the ventilating air passing through the unit so as to humidify the ventilating air when its humidity is low. The air conditioning chamber unit 12 has at its side where the ventilating air exits, the fine mesh filter 23 which contains steel wool similar to that of filter 20 and next to the filter 23 is the separator baffle 24 containing vertically placed baffle plates. The ventilating duct 22 serves to carry the conditioned air from the conditioning unit into the enclosure, the air of which is to be conditioned.

The air conditioning chamber unit 12 comprises the metal casing 25 which forms a part of the air duct through which the air is caused to flow by the action of the ventilating unit 10. The casing 25 contains the atomizer nozzles 21 which serve to project a finely atomized spray of water into the air passing through the spray chamber 12. The atomizer nozzles 21, as shown by Fig. 2, are built up of a plurality of sections. Each section includes two flanges 26 between which are connected the water pipe 27 and the compressed air pipe 28 (Fig. 3), the flanges and the two pipes being connected integrally, the sections being bolted together through the holes 29. When bolted together the pipe sections 27 and 28 form continuous water and air pipes respectively extending across the spray chamber 12. As many sections across the chamber may be used as desired and if desired, another row of the sections may be used above the row shown by Fig. 2.

A water pipe 30 is threaded into the center of each water pipe section 27. Each compressed air section 28 is formed with an air nozzle 31, the water nozzle 30 and the air nozzle 31 being so arranged that the current of air from the air pipe 28 moving across the mouth of the water nozzle 30 produces a suction therein. By having the axis of the water nozzle 30 and the air nozzle 31 arranged at an angle slightly less than 90° to each other, the air current from the compressed air tube 28 is not blown exactly parallel to the exit surface of the water nozzle 30 so that a partial vacuum is produced at different points at the surface of the water nozzle 30, this tending, when the water is being projected from the nozzle, to create turbulence in the water flow, thus breaking the water up into finer particles to assist in the atomizing action.

The associated apparatus for cooperating with the air conditioning chamber unit 12 consists of the combination air and water pump 34 which is mounted on the foundation 35 and is driven by the electric motor 36. In this type of pump the water is used for a seal for the air compressor to prevent leakage of the air around the ends of the compressor blades. The air is drawn into the pump or compressor through the silencer unit 37 which may be of the "Maxim" or any other suitable type and through the pipe 38. Water is drawn into the compressor 34 from the water pipe 39. Air and water are forced out of the pump 34 into the separating chamber 40 which separates the water from the compressed air. The compressed air is carried from the separating chamber 40 to the compressed air nozzles 31 of the atomizer nozzles 21 by means of the connecting air pipe 41. Superheated steam may be supplied to the compressed air pipe 41 from the steam source 42 through the connecting pipes 43 and shut off valve 44. The point at which the steam is introduced into the compressed air pipe 41 should preferably be as close to the atomizing nozzles 21 as possible in order that as little condensation of the steam as possible will take place in the compressed air pipe.

The water for the atomizing nozzles is supplied to the reservoir 45 from a suitable water source through the pipe 46. The nozzle box 51 contains supply water for supplying the water to the atomizer nozzles 21, this water passing from the reservoir 45 to the nozzle box 51 through the supply pipe 52. The amount of water which is atomized by the device is dependent upon the head of the water in the nozzle box 51 and upon the velocity of the compressed air. The velocity of the compressed air is preferably kept constant and the head of the water in the nozzle box varied over a large range to give either a positive or a negative head to control the amount of water passing through the nozzles 21. As more water is permitted to flow into the nozzle box 51, the water level will rise, increasing the positive head of water (or decreasing the negative head) to the nozzles 21, and thus increasing the rate at which the water is drawn out by the blast of compressed air. The water pipe 50 connects the reservoir 45 and the pump 34 and serves to return excess water in the separating chamber 40 to the reservoir 45 due to the pressure maintained in the chamber 40 by the operation of the pump 34.

The lower portion of the casing 25 of the spray chamber 12 has formed therein the drain pan 57 which serves to collect any water deposited within the spray chamber. Excess water from the drain pan 57 passes through the pipe 48 into the reservoir 64. In order that sufficient water may be present within the compressor 34 to serve as a seal, the tank 64 is connected by means of the pipe 39 to the compressor and a pipe 52 to the main supply reservoir 45.

Thermostats 70 and 71 are responsive to wet bulb temperatures and may be located in the enclosure to be air conditioned near thermostat 73 in the flow of air passing through the unit at any point between ventilating unit 10 and outlet 22 where a representative wet bulb temperature may be obtained. Fig. 10 shows an enlarged view of the thermostat 70. Thermostat 71, of course, is arranged in exactly the same way as thermostat 70 and the following remarks apply to both wet bulb thermostats. The small pipe line 110 carries water from the reservoir 45 to the temperature responsive elements of the wet bulb thermostats 70 and 71 (Figs. 1 and 10). Referring now to Fig. 10, the water from the reservoir 45 is carried through the pipe 110 past the valve 111, through the pipe 112 which has the glass indicator arranged therein so that the rate of flow of the water can be observed. Arranged over the lower end of the pipe 112 and over the temperature responsive element 113 of the wet bulb thermostats is the wick 114 of the ordinary type commonly used with wet bulb thermostats. The wick 114 is preferably constricted near its center as by the cord 115. In operation the operator adjusts the valve 111 and makes observations of the wick 114 and the indicator 113 to see that the proper amount of moisture is being applied to the wick at which time the wet bulb thermostats will respond to the wet bulb temperatures. Any inability of the wet bulb thermostats to respond accurately to wet bulb temperatures is, with the present system, unimportant since the thermostats will respond to changes in wet bulb temperatures their response being proportional at all times.

The air tank 9 is supplied with air from the compressor 34 through the pipe 9 and serves to maintain a constant pressure to the air lines of the thermostats 70, 71, and 73, and to the pressure responsive device 75. The wet bulb thermostat 70 controls through the steam valve 76 the amount of steam from the tank 42 to the heater coils 16, and thus controls the temperature of the air passed by the ventilating unit 10 into the spray chamber 12. One way of operating the valve 76 by the thermostat 70 with air from the tank 72, is shown in detail by Fig. 5, where air from the tank 72 is seen to pass through the thermostat 70 and to be controlled thereby so as to actuate the valve 76 and so control the steam passing through the pipe in which the valve is connected.

The wet bulb thermostat 71 controls in like manner the valve 77 in the water line leading to the nozzle box 51. The operation of the wet bulb thermostats will be brought out later on in the discussion of the operation of the device as a whole.

The dry bulb thermostat 73 is exposed to the influence of the air within the enclosure and actuates the water valve 78 in the water line to the nozzle box 51. The purpose and operation of this dry bulb thermostat will be brought out later in the explanation of the operation of the apparatus.

The pressure responsive device 75 is actuated by the pressure of the water in the nozzle box 51. The pressure responsive device 75 operates the motor switch 79 when the water becomes low in the nozzle box 51, the motor switch acting to disconnect the electrical power from the motor 36 to prevent compressed air being supplied to the atomizer nozzles 21 when there is no water there available for use in the spray.

Operation of the system will now be explained. With the system used for humidifying air, the ventilating air is forced by the fan 14 past the heating coils 16 of the heater unit 11, thus heating the air to the desired temperature. This heated air passes into the air conditioning chamber unit 12, through the separator baffle plates 19, and filter 20, and passes from the spray chamber 12 through the filter 23, separator baffle 24, and duct 22, into the room. The atomizer nozzle 21 is so arranged that the compressed air from the compressed air pipe 28, blowing across the water nozzle 30, produces a very finely atomized spray of water. The superheated steam introduced into the compressed air pipe 41 from the steam source 42 enables a higher relative humidity to be obtained from the use of the apparatus inasmuch as insufficient steam is supplied to raise the temperature unduly, but sufficient steam is supplied to get more complete saturation, the steam being so mixed with the large amount of compressed air that no excess steam is required to obtain complete saturation. It is intended that steam in small quantities shall be admitted to the compressed air line 41 through valves 44 and 74 only when unusually high humidities are required. Under these conditions valve 44 is manually adjusted to admit the minimum amount of steam and increased quantities of moisture above this amount are controlled automatically by the method about to be described through automatic valve 77. The spray which leaves the atomizer nozzle 41 consists of finely atomized particles of water mixed with air and steam, and is so fine that it is readily vaporized by the heated air passing through the spray chamber. The atomized spray from the nozzle 21 is projected initially to oppose the air flow so that the water particles will not only have a high relative velocity, but maintain this velocity relative to the air particles for a considerable period of time so that the most complete humidification is obtained by the time the water particles reach the rear of the spray chamber.

Any entrained moisture in the air passing from the spray chamber 12 is precipitated on the finely divided mesh of the filter 23 and drains back into the drain pan 57. In like manner that portion of the spray not taken up by the air drains down into the drain pan 57. This feature becomes the principle upon which the unit air sample to be described later in Figs. 6, 7, and 8 operates. As the wet bulb temperature of the air changes, the thermostat 70 responds by adjusting the steam valve 76 to compensate for the change in temperature by adjusting the heat of the steam coils 16. As the wet bulb temperature of the air falls, the thermostat 70 acts to open to a greater extent the steam valve 76 to cause an increased heating of the air by the steam coils 16. As the wet bulb temperature of the air increases above the desired level, the thermostat 70 acts to close the steam valve 76 and so decrease the heat given to the air by the steam coil 16.

The dry bulb thermostat 73 which is exposed to the air within the enclosure also actuates a valve in the water line to the nozzle box and as the dry bulb temperature increases above the desired level admits by control of the water valve 78 the water entering the nozzle box and the intensity of the spray so that variations of the dry bulb temperature are compensated for by variations of the amount of the spray from the atomizer nozzles 21.

As the air passing through the conditioning unit, especially in a recirculating system, where a portion of the air to be conditioned is recirculated from the enclosure through the device, attains the desired degree of relative humidity, less and less spray will be projected into the spray chamber by the atomizer nozzles 21 due to the fact that the control thermostats being responsive to the wet and dry bulb temperatures of the air which temperatures determine the relative humidity actuate controls to decrease the amount of water projected into the spray chamber as less water is required.

A condition may arise due to extreme changes in outdoor temperature where the wet bulb temperature of the air has increased to such an extent that even after the thermostat 70 has completely shut off the steam to the steam coils 16, the wet bulb temperature of the air entering the spray chamber 12 is too high. The wet bulb thermostat 71 which is responsive to the same temperature as that of thermostat 70 is therefore responsive to these changes of the wet bulb temperature of the air entering the spray chamber caused by these outdoor conditions and acts to shut off the amount of water entering the nozzle box 51 and accordingly the intensity of spray from the atomizer nozzle 21 so that an ever increasing amount of spray will not be projected into the chamber 12 by valve 77 in attempting to cool the air passing through the spray chamber so as to hold it at the desired temperature under these extreme conditions. At the same time valve 74 is shut off by the same action of thermostat 71, valve 74 being in parallel connection with valve 77 and the steam supply is shut down.

With these control features, it is seen that regardless of weather changes the temperature and condition of the air within an enclosure may be maintained substantially constant without need for personal observation or manual control. The various automatic features forming a part of this invention, acting in every instance to maintain the conditioned air exactly as desired.

Another way of obtaining accurate indications of wet bulb temperatures regardless of the amount of spray projected into the spray chambers of air conditioning units is to utilize an air sampler for determining the wet bulb temperatures of the air passing through the unit. Such a sampler is described in my co-pending application, Serial No. 462,780, filed June 21, 1930. This type of sampler supplies a constant supply of water to the air passing therethrough so that there is a constant amount of water being returned to a thermostat reservoir in which control thermostats are located. Fig. 7 illustrates a form of air sampler which is seen to be a miniature spray chamber, and Figs. 6 and 8 illustrate the use of such a sampler for obtaining correct wet bulb temperature indications with air conditioning systems.

Referring now to Fig. 7, a constant water pressure from a suitable water source is supplied to the water nozzle of the atomizer nozzle 90. A suitable air velocity is maintained through the air pipe 91 to the air nozzle of the atomizer nozzle 90. Since a constant supply of water is passing into the spray chamber, a constant supply of returned water passes into the drain pan 92 and the thermostat reservoir 93 to actuate the thermostats 94 and 108 which respond to the temperature of the returned water which, as has previously been explained, corresponds to the wet bulb temperature of the air in the spray chamber, and which correspond to the thermostats 70 and 71 of Fig. 1 and may replace these thermostats.

Referring now to Fig. 6, there is shown a conditioning system comprising the three unit conditioners there shown. Each of these unit conditioners may be similar to the unit conditioner illustrated by Fig. 1 except that the central air compressor actuates the air nozzle of each spray chamber and the wet bulb thermostat in each case is actuated by water returned in the thermostat reservoirs from the unit samplers 95. The samplers 95 are not provided with fans for drawing air from the unit conditioners with which they are associated but have their outlet side connected to a common return pipe 96 which in turn is connected to the intake side of the central air compressor 97. The output side of the central air compressor 97 has the common pipe 98 connected to the air nozzles of each working spray chamber. The central air compressor 97 also supplies through the common air pipe 99, air to the air nozzles of the unit samplers 95. With this arrangement it is seen that the air to the central air compressor 97 is driven through the unit samplers 95 and this movement through the samplers causes air to be withdrawn from the unit conditioners with which they are associated, and it is this air drawn by the action of the air compressor which has its wet bulb temperature indicated by the water returned from the spray chambers of the unit samplers.

In Fig. 6 each unit conditioner has its own wet bulb temperature thermostat controls actuated by a unit sampler in its output duct. The wet bulb thermostats contained within the thermostat reservoirs 93 actuate the steam and water valves in the same way that the wet bulb thermostats 70 and 71 of Fig. 1 operate the steam and water valves there shown. Referring now to Figs. 7 and 9, the wet bulb thermostat 94 is connected to one or more steam valves leading to the heater unit of each unit conditioner and thermostat 108 is connected to and actuates a valve in the water line actuating the spray nozzles of each unit conditioner.

Since where several unit conditioners are placed throughout a building it may be that temperature and atmospheric conditions common to one unit conditioner are common to all of the unit conditioners, one unit sampler associated with one of the unit conditioners may satisfactorily control the control valves of all of the unit conditioners. Such an arrangement is shown schematically by Fig. 8. The unit conditioner #2 thereshown has the unit sampler 95 associated with it and this single unit conditioner has its associated wet bulb thermostats actuate the control valves of all of the unit conditioners of the system.

Whereas one or more embodiments of the invention have been described for the purpose of illustration, it should be understood that the invention is not limited to the specific structures disclosed, but only by the annexed claims.

What is claimed is:

1. An air conditioning system comprising a ventilating unit, a heater unit, a spray chamber, and means responsive to the temperature of the water returned from said spray chamber for controlling the temperature of said heater unit.

2. A system for conditioning the air within an enclosure comprising a ventilating unit, a heating unit, a spray chamber, means responsive to the temperature of the water returned from the spray of said chamber for controlling the temperature of said heating unit, and means responsive to the dry bulb temperature of the air within said enclosure for controlling the amount of spray projected in said chamber.

3. An air conditioning system comprising a ventilating unit, a steam heater unit, a spray chamber, and a thermostat responsive to the temperature of the water returned from the spray in said chamber for operating a valve in a steam line to said heater unit for controlling the temperature of the air entering said spray chamber.

4. A system for conditioning the air within an enclosure comprising a ventilating unit, a spray chamber, an atomizer nozzle in said spray chamber, means for supplying air and water to said nozzle to produce a spray therefrom, and means responsive to the dry bulb temperature of the air within said enclosure for controlling the amount of spray projected from said nozzle.

5. An air conditioning system comprising a ventilating unit, a heater unit, a spray chamber, an atomizer nozzle in said spray chamber, means for supplying air and water to said nozzle for producing a spray therefrom, and means responsive to the temperature of the water returned from said spray for controlling the temperature of said heater unit.

6. An air conditioning system comprising a ventilating unit, a heater unit, a spray chamber, means responsive to the temperature of the water returned from the spray in said chamber for controlling the heat supplied by said heater unit, and another means controlled by the temperature of the water returned from the spray in said chamber for lowering the temperature of the air when due to atmospheric conditions, said heater unit has been completely shut off by said first mentioned means and the temperature of the air entering the system is still too high.

7. An air conditioning system comprising a ventilating unit, a heater unit, a spray chamber, an atomizer nozzle in said spray chamber, means for supplying air and water to said nozzle for producing a spray therefrom, a thermostat responsive to the water returned from said spray for controlling the heat of said heater unit, and another thermostat responsive to the temperature of the water returned from said spray for increasing the amount of water in said spray for lowering the temperature of the air when due to atmospheric conditions said heater unit has been completely disconnected by said thermostat and the temperature of the air entering the system is still too high.

8. A humidifying system comprising a ventilating unit, a heater unit, a spray chamber, a wet bulb thermostat responsive to the water returned from the spray in said chamber for controlling the heat from said heater unit, a dry bulb thermostat in said enclosure for controlling the amount of water sprayed in said chamber, and means for passing additional water to contact with the air when due to the air taking on the desired relative humidity the amount of water supplied to and returned from the spray in said chamber is insufficient to cause said wet bulb thermostat to respond accurately to the wet bulb temperature of the air.

9. A humidifying system comprising a ventilating unit, a heater unit, a spray chamber, a wet bulb thermostat responsive to the water returned from the spray in said chamber for controlling said heater unit, a dry bulb thermostat in said enclosure for controlling the amount of water sprayed in said chamber, a fine mesh wire filter in the exit end of said spray chamber, and means for passing water in contact with the wires in said filter when due to the air taken on the desired relative humidity, the amount of water supplied to and returned from the spray in said chamber is insufficient to cause said wet bulb thermostat to accurately respond to the wet bulb temperature of the air.

10. A humidifying system comprising a ventilating unit, a spray chamber, a water reservoir, a water nozzle connected to the water in said reservoir, an air nozzle for atomizing the water from said water nozzle, means for supplying air to said air nozzle, and means effective to discontinue said first mentioned means when the water in said reservoir reaches a predetermined low level.

11. A humidifying system comprising a ventilating unit, a spray chamber, a water reservoir, a water nozzle connected to the water in said reservoir, an air nozzle for atomizing water from said water nozzle, and means for shutting off the supply of water to said reservoir when the desired relative humidity has been attained.

12. A humidifying system comprising a ventilating unit, a spray chamber, a water reservoir, a water nozzle connected to the water in said reservoir, an air nozzle for atomizing the water from said water nozzle, means for supplying water to said reservoir, means for supplying air to said air nozzle, means for shutting off said first mentioned means when the desired relative humidity has been obtained and means for discontinuing said second mentioned means when the water in said reservoir reaches a predetermined level.

13. A system for humidifying the air within an enclosure, comprising a ventilating unit, a spray chamber, and means responsive to the temperature of the water returned from said spray chamber and to the dry bulb temperature of the air of said enclosure for controlling the relative humidity of the air, said means also being effective to hold the temperature as well as the relative humidity of the air at a desired level regardless of atmospheric changes.

14. An air conditioning system comprising a ventilating unit, a heater unit, a spray chamber, a water nozzle and an air nozzle in said chamber, an air compressor for supplying air to said air nozzle for atomizing water from said water nozzle, a sampler chamber associated with said spray chamber, said sampler chamber having a water nozzle, and an air nozzle, and a thermostat in contact with the water returned from said water nozzle, said air nozzles being supplied from said compressor, the output of said spray chamber being connected to the intake of said compressor and said thermostat being effective to control the heat supplied by said heater unit.

15. An air conditioning system comprising a plurality of air conditioning units, each of said units comprising a ventilating fan, a heater, and a spray chamber, each of said spray chambers having a water nozzle and an air nozzle for atomizing the water from said water nozzle, a common air compressor for supplying air to the air nozzles of all of said spray chambers, a sampler chamber associated with the spray chamber of one of said units, said sampler chamber having a water nozzle, an air nozzle for atomizing the water from said water nozzle, and a thermostat in contact with the water returned from said water nozzle, said thermostat being effective to control the heat to the heaters of all of said units.

16. A system for conditioning the air supplied to an enclosure, comprising a spray for moistening air, means for passing the air to be conditioned and supplied to said enclosure through said spray, means responsive to the dry bulb temperature of the air within the enclosure for controlling the amount of moisture added to the air by said spray, and means responsive to the temperature of the water returned from the spray for controlling the temperature of the air entering the spray chamber.

In testimony whereof I affix my signature.

SAMUEL M. ANDERSON.